(12) United States Patent
Kadaba et al.

(10) Patent No.: US 7,660,244 B2
(45) Date of Patent: Feb. 9, 2010

(54) METHOD AND APPARATUS FOR QUALITY-OF-SERVICE BASED ADMISSION CONTROL USING A VIRTUAL SCHEDULER

(75) Inventors: Srinivas R. Kadaba, Chatham, NJ (US); Thierry Etienne Klein, Fanwood, NJ (US); Kin K. Leung, London (GB); Ganapathy Subramanian Sundaram, Hillsborough, NJ (US); Haitao Zheng, Beijing (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 626 days.

(21) Appl. No.: 11/156,752

(22) Filed: Jun. 20, 2005

(65) Prior Publication Data

US 2006/0285490 A1  Dec. 21, 2006

(51) Int. Cl.
*H04L 12/00* (2006.01)
*H04W 72/00* (2009.01)
(52) U.S. Cl. .................. 370/230; 370/395.4; 455/452.2
(58) Field of Classification Search ......... 370/230–234, 370/241, 150, 229, 151, 395.4–395.43, 395.1–395.21, 370/310, 412; 455/450–452.2; 713/503; 718/102–105
See application file for complete search history.

(56) References Cited

U.S. PATENT DOCUMENTS

| | | | |
|---|---|---|---|
| 6,175,554 B1* | 1/2001 | Jang et al. | 370/229 |
| 6,404,766 B1* | 6/2002 | Kitai et al. | 370/392 |
| 6,985,439 B2* | 1/2006 | Hosein | 370/230 |
| 7,149,185 B1* | 12/2006 | Suni | 370/230 |
| 2003/0128665 A1* | 7/2003 | Bernhard et al. | 370/230 |
| 2003/0214951 A1* | 11/2003 | Joshi et al. | 370/395.42 |
| 2004/0242235 A1* | 12/2004 | Witana | 455/452.2 |
| 2005/0007968 A1* | 1/2005 | Hsu et al. | 370/310 |

\* cited by examiner

*Primary Examiner*—Aung S Moe
*Assistant Examiner*—Habte Mered
(74) *Attorney, Agent, or Firm*—Ryan, Mason & Lewis, LLP

(57) ABSTRACT

In a wireless network or other communication system, admission of users to the system involves use of a first scheduler, which makes actual scheduling decisions for admitted users, and a second scheduler, which emulates the operation of the first scheduler. The first scheduler is configured to manage access to network resources for users already admitted to the system. The first scheduler is coupled to an admission control module which contains the second scheduler. The second scheduler, also referred to herein as a virtual scheduler, emulates operation of the first scheduler, under an operating scenario involving admission of at least one additional user to the system, in order to generate a performance metric. The performance metric is used to make an admission control decision regarding admission of the at least one additional user to the system.

16 Claims, 3 Drawing Sheets

METHOD AND APPARATUS FOR QUALITY-OF-SERVICE BASED ADMISSION CONTROL USING A VIRTUAL SCHEDULER

FIELD OF THE INVENTION

The present invention relates generally to wireless networks and other types of communication systems, and more particularly to quality-of-service (QoS) based admission control algorithms for use in such systems.

BACKGROUND OF THE INVENTION

Wireless networks are often configured to support users having different QoS requirements. Such networks typically use a scheduler, implementing a designated scheduling algorithm, in order to meet the QoS requirements.

The term "scheduler" is used herein in a general sense, and accordingly is intended to encompass resource managers which implement various types of resource allocation algorithms. Such resource allocation algorithms may include, in addition to user selection or user ordering algorithms, power control algorithms, rate control algorithms, transmission rate and encoder format selection algorithms, sub-channel allocation algorithms, frequency hopping algorithms, and so on, in any combination.

If the number of users in the network is not too large, the scheduler is usually able to satisfy all the QoS requirements. However, as the number of users in the network increases, it becomes increasingly important to limit the number of users allowed to access the network and to select an appropriate set of users to ensure that the QoS requirements can be satisfactorily met while at the same time maximizing the utilization of the available network resources. Thus, admission control algorithms are used to ensure that the number of users in the network does not exceed the critical limit beyond which the QoS requirements can no longer be satisfied.

The admission control problem is fairly straightforward in wireless circuit-switched networks, but becomes more difficult in wireless packet data networks. The fundamental reason for the added difficulty is that the resources needed to meet the QoS requirements in wireless packet data networks depend not only on the number of users and their QoS requirements, but also on additional factors, such as the locations, channel qualities and traffic patterns of the users. The issue is further complicated by the fact that the mix of applications present in the network is typically varying over time, such that there is no set limit on the maximum number of users that can be admitted to the network.

Current solutions to the admission control problem have generally considered the problem from a circuit-switched point of view, in which a predetermined number of circuits or other channels are available and have to be shared between the competing users. The basic underlying assumption is that each user consumes a finite number of channels, which is fixed and independent of the user location and channel conditions, as well as the locations and channel conditions of the other users. In addition, the QoS requirements in the circuit-switched context typically include the probability of blocking a new call or the probability of dropping a handoff call. Once a user is accepted to the network, it is assumed that the achieved performance is acceptable to the user and the associated application. However, these assumptions are generally not valid in wireless packet data networks that rely on opportunistic scheduling algorithms to allocate the available resources between competing users.

Furthermore, current admission control techniques often consider only such limiting resources as the processing power of the base station, the number of codes available, the channel elements available, the memory and buffer requirements, or the backhaul capacity. However, in a wireless packet data network which supports multimedia applications, the performance as perceived by each application (e.g., in terms of factors such as the minimum achieved throughput, the average throughput, the average and the maximum delay, or the packet loss rate) is of more importance and is in fact expected to limit the number of concurrent applications that can be supported by the network.

It is therefore apparent that current admission control techniques are often based on assumptions which are not readily applicable to wireless packet data networks, and as a result such techniques do not adequately take certain constraints and requirements into account when deciding on the admission or rejection of a new user. Accordingly, a need exists for improved techniques which overcome one or more of the drawbacks of the conventional approaches as outlined above.

SUMMARY OF THE INVENTION

The present invention in an illustrative embodiment provides an improved admission control technique which utilizes a virtual scheduler.

In accordance with one aspect of the invention, as implemented in a wireless network or other communication system, admission of users to the system involves use of a first scheduler and a second scheduler. The first scheduler is also referred to herein as an actual scheduler. This scheduler manages access to network resources for users already admitted to the system, for example, by making actual scheduling decisions for those users. The second scheduler, also referred to herein as a virtual scheduler, emulates operation of the first scheduler, under an operating scenario involving admission of at least one additional user to the system, in order to generate a performance metric. The performance metric is used to make an admission control decision regarding admission of the at least one additional user to the system. The admission control decision may be based on whether the system can support QoS requirements of one or more additional users without violating any QoS requirements of the users already admitted to the system.

The virtual scheduler may be implemented in an admission control module which is coupled to, and receives inputs from, the first scheduler. Such an admission control module may comprise, for example, an evaluation module which implements the virtual scheduler for generating the performance metric, and a decision module adapted to receive the performance metric from the evaluation module and to make the admission control decision based on the performance metric. The evaluation module receives as inputs one or more QoS-related inputs, one or more RF-related inputs, and one or more scheduler-related inputs, and processes the inputs to generate the performance metric.

In one illustrative embodiment, the QoS requirements for K admitted users are specified in terms of a minimum average throughput $R_{min}$ per user, and the admission control module receives as inputs $R_i^{(K)}(t)$, for $i=1, \ldots, K$, where $R_i^{(K)}(t)$ denotes the average throughput of admitted user i before a new user K+1 is admitted to the system, and where $\forall i = 1, \ldots, K$, $R_i^{(K)}(t) \geq R_{min}$, i.e., the current system is feasible. The virtual scheduler emulates the operation of the first scheduler as applied to a system with K+1 users, and the performance metric is generated as $R_i^{(K+1)}(t+\Delta)$, for $i = 1, \ldots, K+1$, where $R_i^{(K+1)}(t+\Delta)$ denotes the average throughput of user i in the system with K+1 users at time t+Δ, and where Δ denotes a convergence time of the system with K+1 users. The convergence time may be viewed as the time that the system of K+1 users would take to "settle down" or reach steady state. The admission control decision in this embodiment comprises a decision to admit the new user K+1 to the system if the following condition is satisfied for all users i= 1, . . . , K+1:

$$R_i^{(K+1)}(t+\Delta) \geq (1+\delta)R_{min},$$

where δ is a variable margin parameter that may be used to tune the admission control algorithm. Other embodiments may involve different QoS requirements, admission control module inputs, performance metrics and admission control decision criteria.

Advantageously, the admission control techniques of the illustrative embodiments are independent of the underlying scheduling algorithms, and a given technique can thus be adapted for use with any scheduling algorithm.

The present invention in the illustrative embodiments provides a number of additional advantages over conventional practice. For example, the admission control techniques of these embodiments incorporate the QoS requirements of the different users into the admission control decision. Also, the admission control decision is tailored towards wireless packet data networks and the use of opportunistic scheduling algorithms.

DETAILED DESCRIPTION OF THE INVENTION

The invention will be described herein in conjunction with exemplary communication systems and associated admission control techniques. It should be understood, however, that the invention is more generally applicable to any admission control application, in any type of wireless network or other communication system, in which it is desirable to provide an enhanced ability to determine an appropriate level of admissible users in the presence of one or more QoS requirements. For example, although the admission control techniques in the illustrative embodiments are particularly well suited for use in CDMA 2000 and UMTS networks, the invention is not restricted to use with any particular type of wireless network or other communication system. The techniques can be applied to forward links, reverse links, or both, as well as other types of links or more generally other shared communication media.

The term "call" as used herein is intended to be construed generally, so as to encompass, by way of example, not only voice calls, but also other types of applications, connections, sessions or other communications, involving data, audio, video, speech or other information, in any combination.

The term "user" as used herein is also intended to be construed generally, so as to encompass, by way of example, a communication device such as a mobile telephone, computer or personal digital assistant (PDA), or portions or combinations of such devices. The term may also be used to refer to an associated application, individual or other entity which makes a call within a system using a communication device.

The term "module" as used herein should not be construed as requiring any particular physical configuration. A module may comprise hardware, software or firmware, or combinations thereof.

As indicated above, the term "scheduler" as used herein is intended to be construed generally, so as to encompass, by way of example, any arrangement of hardware, software or firmware, or combination thereof, which performs at least a portion of a scheduling algorithm. Accordingly, a scheduler in one embodiment may comprise, for example, a resource allocation module or other type of resource manager that operates in conjunction with a scheduling algorithm, or in another embodiment may itself be an element of a resource manager which incorporates, in addition to the scheduler, a resource allocation module. Thus, a scheduler may be, for example, a resource manager which implements one or more resource allocation algorithms. As noted previously herein, such resource allocation algorithms may include, in addition to user selection or user ordering algorithms, power control algorithms, rate control algorithms, transmission rate and encoder format selection algorithms, sub-channel allocation algorithms, frequency hopping algorithms, and so on, in any combination. It is to be appreciated that these and other algorithms, as well as combinations thereof, are intended to fall within the scope of the general term "scheduling algorithm" as used herein.

Figure 1A:
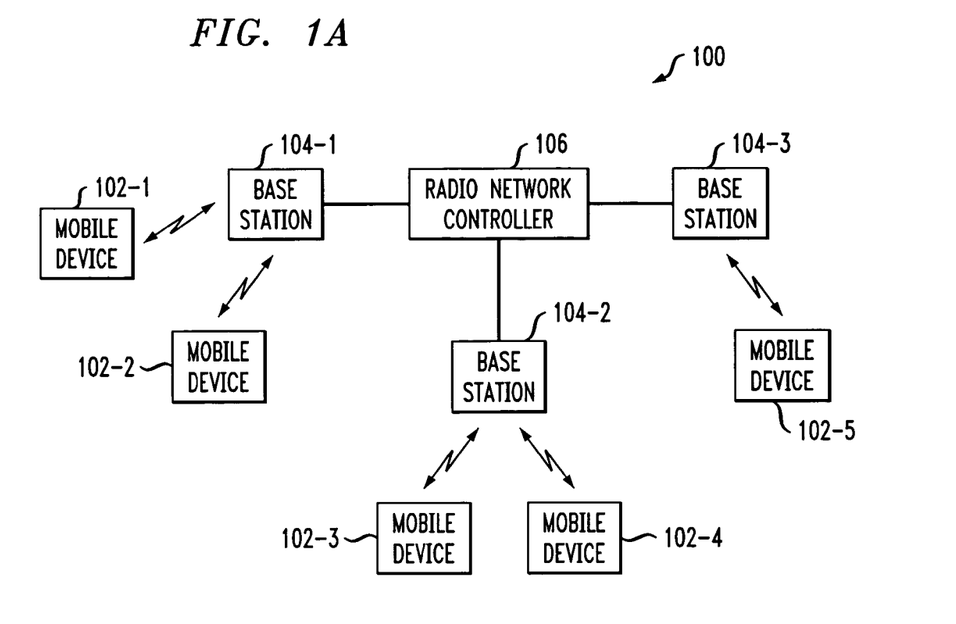
FIG. 1A is a block diagram of a communication system in which the present invention may be implemented.

FIG. 1A shows a simplified diagram of a portion of a communication system 100 in which the present invention may be implemented. The system, which may be a CDMA 2000 or UMTS network, comprises a plurality of mobile devices 102-1, 102-2, . . . 102-5, which communicate with base stations 104-1, 104-2 and 104-3 as shown. The base stations are coupled to a radio network controller (RNC) 106. The mobile devices 102 may be viewed as examples of what are more generally referred to herein as communication devices, or still more generally, users. Of course, the system may include a substantially larger number of mobile devices, base stations and RNCs, as well as additional elements not explicitly shown, as will be appreciated by those skilled in the art.

Figure 1B:
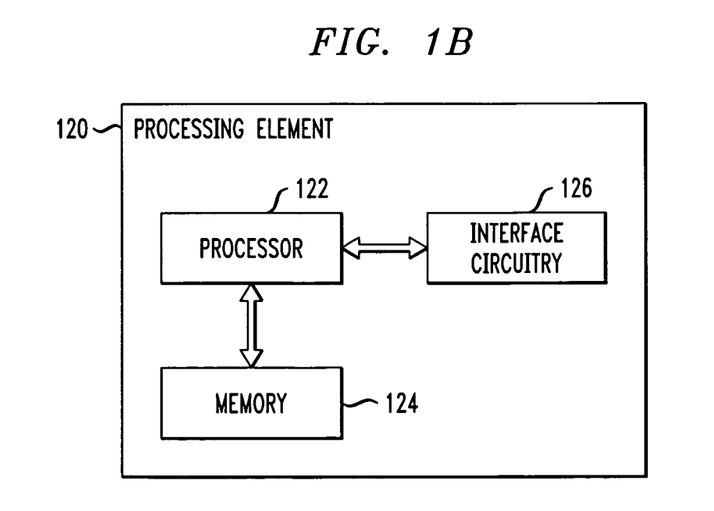
FIG. 1B shows a processing element of the FIG. 1A system.

A given processing element of the system 100, such as a particular mobile device, base station, RNC, or a portion thereof, may be configured generally as shown in FIG. 1B. As illustrated in the figure, a processing element 120 comprises a processor 122 that is coupled to a memory 124 and to interface circuitry 126. The processor 122 may comprise one or more microprocessors, digital signal processors, central processing units, application specific integrated circuits, or other types of processors, as well as portions or combinations of such devices. Memory 124 may comprise random access memory (RAM), read-only memory (ROM), magnetic or optical media, or other types of storage devices, as well as portions or combinations of such devices. The characteristics of the interface circuitry 126 will vary depending upon the functionality of the processing element. For example, if the processing element 120 is viewed as one of the base stations 104, the interface circuitry may comprise RF circuitry for supporting forward link and reverse link communication with the mobile devices 102, and additional circuitry for interfacing with the RNC 106.

Conventional aspects of the operation of system 100 and processing element 120 are well known to those skilled in the art, and therefore not described in detail herein.

The present invention in an illustrative embodiment provides an admission control technique which determines whether a wireless network, such as that of FIG. 1A, can support a new call, with its associated QoS requirements, without violating any of the QoS requirements of the existing users already admitted to the network. The term "network" in this context may be viewed as an example of the more general term "system." Thus, description herein making reference to admission to a system is intended to encompass arrangements involving admission to a network.

For simplicity and clarity of description, it is assumed for the illustrative embodiment that the new call is from a new user. Thus, if there are K existing admitted users, the admission control (AC) decision is whether or not to admit user K+1. However, the described techniques are applicable to any type of new call, including a new application, connection or session for an existing admitted user. As far as the AC decision is concerned, these different scenarios can be treated in a similar manner.

Figure 2A:
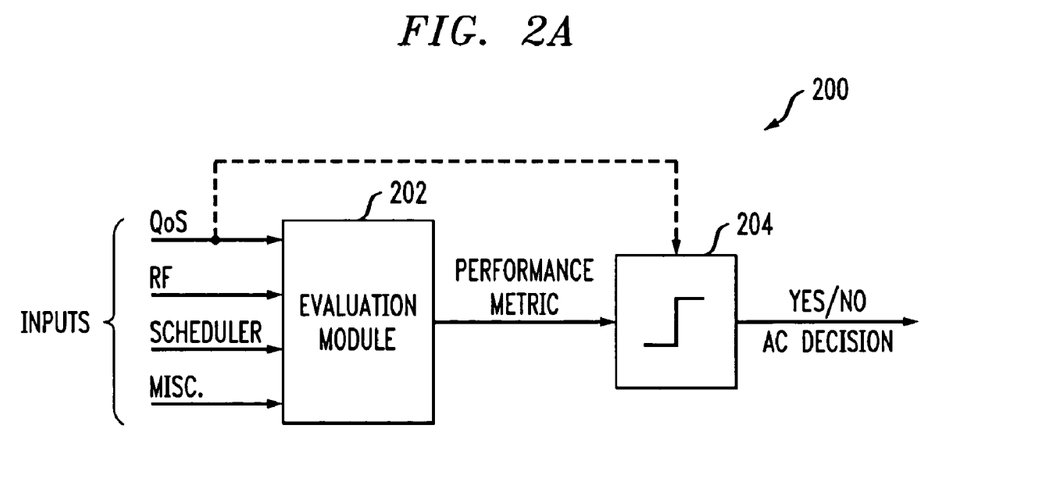
FIG. 2A is a block diagram of an admission control module that may be incorporated into a base station or other processing element of the FIG. 1A system, in accordance with an illustrative embodiment of the present invention.

FIG. 2A shows an admission control module 200 which implements an admission control technique in the illustrative embodiment. The admission control module 200, also referred to herein as an AC module, comprises an evaluation module 202 coupled to a decision module 204. The evaluation module 202 receives a number of inputs, to be described in detail below, and generates as an output a performance metric which is applied as an input to the decision module 204. The decision module 204 generates an AC decision, which in this embodiment is a Yes/No decision regarding the admission of user K+1 to a network with K admitted users.

It is to be appreciated that this particular AC module configuration is not a requirement of the present invention. Other configurations of elements, with other input and output signal arrangements, may be used to make AC decisions using the techniques of the present invention.

Figure 2B:
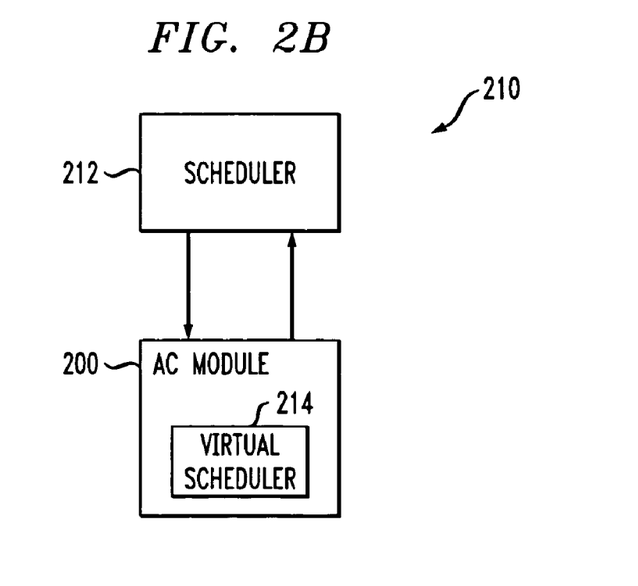
FIG. 2B is a block diagram illustrating interaction between the admission control module of FIG. 2A and a scheduler of the system.

In accordance with an aspect of the invention, the AC module 200 of FIG. 2A interacts with a resource allocation module of the system. Such a resource allocation module is more generally referred to herein as a scheduler. FIG. 2B shows an example of a processing element 210 of the system, which comprises AC module 200 coupled to scheduler 212. As will be described in greater detail elsewhere herein, the AC module 200 comprises a virtual scheduler 214. The scheduler 214 is "virtual" in that it emulates the operation of actual scheduler 212 for purposes of admission control but typically does not itself make scheduling decisions.

The processing element 210 may comprise a processor coupled to a memory, as illustrated generally in FIG. B, and the AC module 200 and scheduler 212 may be implemented at least in part in the form of software that is stored in the memory 124 and executed by the processor 122. Of course, numerous other arrangements of hardware, software and firmware, in any combination, may be used in implementing the present invention.

One or more AC modules 200 may be associated with each of the base stations 104 of the FIG. 1A system. For example, the AC decisions could be made at each base station for the users that initiate calls with that base station. However, if the processing capabilities at the base stations are limited, it may be preferable to make the AC decisions at other locations in the network. As an example of one such alternative arrangement, the AC decisions could be made at the RNC 106, which would then incorporate one or more of the AC modules 200. An added advantage of this latter arrangement is that the RNC may have access to application-layer information that can aid in the AC decision process. Furthermore, the RNC has a more global view of the network that spans across multiple base stations, thereby ensuring that the AC decision is consistent with the general status and loading conditions of the network. In the illustrative embodiment, since call processing is typically performed at the RNC, the RNC at least has to be informed of the AC decision, independently of where the actual decision is made. Regardless of the location of the AC module, it is assumed that all the parameters needed to arrive at the AC decision are available or can be conveyed to the AC module.

The AC decisions may be made on a per-user basis, or on other types of bases, such as, for example, a per-application basis, a per-connection basis, a per-session basis, etc. In other words, each application, connection or session for each user may be considered as a separate "virtual" user, with AC decisions being made across such virtual users.

Although shown in the FIG. 2B embodiment as being implemented in a single processing element, it is possible for the AC module 200 and scheduler 212 to be implemented using multiple processing elements, e.g., a first processing element to implement the AC module and a second processing element to implement the scheduler 212. These multiple processing elements may be in a single system base station, a single RNC, or distributed across a number of such base station or RNC elements.

In the illustrative embodiment, it is assumed that the QoS requirements cannot be renegotiated if the initial set of requirements was deemed infeasible. However, the techniques described can be extended in a straightforward manner to accommodate arrangements involving renegotiation of QoS requirements.

Also, if the QoS requirements of the existing user and the new user cannot be satisfied simultaneously, it is considered preferable, from a customer satisfaction point of view, to block the new user, rather than to admit this user and drop an existing user from the system. Other rules can be used in alternative embodiments.

It is further assumed in the illustrative embodiment that the arrival rate of new users is relatively small compared to the timescale of the scheduler. In other words, it is assumed that once a new user has been admitted to the network, the network reaches its new steady state before the next user arrival. This assumption allows us to focus on single-user admission scenarios.

These and other assumptions made herein are for simplicity and clarity of description only, and should not be construed as limiting the scope of the invention in any way. Those skilled in the art will recognize that the invention can be implemented in alternative embodiments in which one or more of these assumptions do not apply.

The AC module 200 is typically operating in real-time during the operation of the network and assumes that a certain number of users have been admitted to the network and are being satisfactorily served.

The inputs to the evaluation module 202 of AC module 200 will now be described in greater detail. The inputs in this illustrative embodiment can be generally categorized as comprising QoS-related inputs, radio frequency (RF)-related inputs, scheduler-related inputs, and miscellaneous inputs. It is to be appreciated that the invention does not require this particular set of inputs, and can operate with a subset of these inputs, or other types of inputs.

The QoS-related inputs are typically application-specific and are made available during an initial call request. Since we have assumed that there is no QoS renegotiation, the QoS requirements can be considered to be static and independent of the user location or the number of users in the system. Some examples include minimum throughput requirements, maximum delay requirements, and packet loss rate. Packet loss rate is most important for voice over Internet protocol (VoIP) and other real-time applications with limited retransmissions and maximum delay constraints.

The RF-related inputs include any information that may be available regarding the wireless channel experienced by the different mobile users. This information can be highly dynamic and user-dependent. Some examples include long-term geometry and average channel gain, instantaneous channel fluctuations as estimated based on channel conditions, and Doppler information and information on variability of channel conditions. Another example is a priori information on channel behavior obtained through modeling or statistical measurements. This latter information is particularly useful in estimating the channel conditions of the new user and the corresponding required resources.

The scheduler-related inputs comprise information that is available or can be derived from a resource allocation module or other type of scheduler, such as scheduler 212 of FIG. 2B. Since available resources are typically scarce, most current and future wireless networks require a resource allocation manager to allocate the different resources to the mobile users in a fair and efficient manner. The performance achieved by each user depends of course on the resource allocation strategy and therefore it is important that the AC module 200 be aware of this resource allocation strategy. Most resource allocation strategies are opportunistic and rely on channel condition information. Examples of scheduler-related inputs include average throughput achieved by existing users in the system, delay performance achieved by existing users, achieved average packet loss rate by existing users, information on queue sizes and backlog on a per-user, per-stream basis, arrival time of data to user queues, and initialization of internal parameters of the scheduler.

The miscellaneous inputs may comprise, for example, application-layer information such as type of application and total amount of data to be transmitted, information on flow control and inflow of data to user queues, signaling, call control and radio resources, such as available power, codes and channel elements, traffic model for arriving and departing users, revenue expectations and price points for different user classes and applications, opportunity cost for blocking users, etc.

In the case of VoIP applications, additional miscellaneous inputs may be considered in order to achieve greater efficiencies and increase the number of VoIP users that can be simultaneously supported, while meeting the delay bound for each packet with high probability. Such inputs may relate, by way of example, to techniques such as frame aggregation, adaptive aggregation and multi-user aggregation. Frame aggregation refers to a technique by which a single user can hold some VoIP frames until subsequent frames have arrived and thereby gain greater efficiency for the encoder packets that are transmitted over the air. In adaptive aggregation, the aggregation involves new frames and old frames that may have to be retransmitted due to frame errors. Thus, the aggregation is only performed when needed. Multi-user aggregation is usually possible on the downlink channel only, in which VoIP frames from multiple users are aggregated in one single encoder packet. A preamble allows the users to determine which frame, i.e. which part of the larger encoder packet, if any, is destined for them.

The operation of the evaluation module 202 will now be described in greater detail. The objective of the evaluation module is to determine a performance metric, based on which the admission decision is then made. The evaluation module may comprise, by way of example, a mathematical function relating the input parameters and calculating the performance metric. Note that, depending on the AC module, some or all of the input parameters may be used. The performance metric in the illustrative embodiments is a measure of the performance of the network assuming that the new user is admitted to the network. Some examples include estimated average throughput for each user, estimated average or maximum frame or packet delay for each user, estimated frame or packet loss rate for each user, and average percentage change in user-perceived throughput after the new user is admitted to the network. Other statistical descriptions of these metrics, such as the mean, median, or a specific percentile, may also be used. The invention does not require any particular type or configuration of performance metric, and the term is thus intended to be construed generally so as to encompass any type of information indicative of system performance.

As a more particular example of a frame delay performance metric, consider the VoIP context, in which a frame is deemed to be lost if it is not correctly received by the user within a fixed, pre-specified delay bound. Even though the frame may eventually be delivered without error at the physical and link layers, the fact that the frame arrived later than the maximum allowed frame delay is interpreted as a lost frame by the VoIP application. If too many frames are lost, the quality of the conversation is severely degraded and the call can no longer be maintained.

As indicated previously, numerous other types of performance metrics may be used in implementing the invention, and the invention should therefore not be construed as being limited to any particular type or types of performance metrics.

The role of the decision module 204 is to use the performance metric as calculated by the evaluation module 202 and decide whether or not the new user should be admitted to the network. In order to do so, the decision module may require information about the QoS requirements for each user.

For example, if the performance metric comprises the achieved throughputs of the existing users and the new user, the decision module may compare these achieved throughputs to respective minimum required throughputs. If all the users achieve at least their minimum required throughput, the new network load is deemed to be feasible and the new user is admitted to the network. Otherwise the new user's request for admission is denied.

As another example, if the performance metric comprises the average percentage change in perceived throughput, the new user may be admitted to the network if this percentage change does not exceed a pre-specified threshold. In this case, the QoS requirements are not explicitly used by the decision module, but have already been factored into the performance metric.

As a further example, if the performance metric comprises the frame error rate, such as may be the case for VoIP applications, the decision module may compare the expected frame error rate for the existing and new users with a maximum tolerable frame error rate. The presence of the new user may lead to longer transmissions delays for the frames of the existing users, by virtue of the fact that the scheduler will allocate some time slots to the new user. So it is conceptually possible that the presence of the new user increases the frame error rate beyond the maximum allowable frame error rate and thereby makes the new system infeasible. This is in addition to the fact that the channel quality of the new user may not be strong enough and induce a lot of retransmissions that could further increase the delay, for the new user itself or for any or all of the existing users. If the calculated average frame error rate for the existing and new users is smaller than the maximum allowed error rate, the new user can be admitted to the network, as that user will not lead to an unacceptable performance degradation of the existing users while itself achieving acceptable performance.

As yet another example, in an integrated system in which different applications co-exist, the performance metric could be a combination of minimum throughput requirements and maximum frame error rates. For those applications that are concerned with their throughput, the decision module compares the actual achieved throughputs or the predicted throughputs assuming the new user were admitted to the network, with the minimum throughput requirements. Similarly, for the real-time applications that may be more concerned with frame error rate, the actually achieved frame error rates or the predicted frame error rates are compared to the maximum tolerable rates. The new user is then admitted to the network only if all of the above requirements, under the new network loading, can be satisfied. In this sense, it does not matter how many different applications are simultaneously supported by the network and what their respective QoS requirements are as long as all the individual requirements can still be met after the new user is admitted to the network.

When making the AC decision, some additional margins on the user performance can be included to account for modeling uncertainties, or prediction and estimation errors. In that case, the new user may be rejected even though the new network load is still feasible, but the feasibility margin may be too small. The margin can be tuned to achieve more aggressive or more conservative AC decisions. It could be even be set to disable AC, thereby always accepting new arrivals. For example, this could be done based on the type of users such as different grade-of-service (GoS) classes or new calls as opposed to handoff calls. These and other user-differentiating classifications are intended to be encompassed by the general term "QoS requirements" as used herein.

As one possible extension to the basic AC decision process described above, the decision criterion can include the revenue from users admitted to the network as well as future revenue expectations from new arriving users in the future. In such a scenario, the AC module 200 may utilize statistical information on the call arrival and call holding times, the potential revenues from different user classes as well as the opportunity cost of blocking users. The opportunity cost includes both the cost of underutilization of the available network resources as well as the potential loss of revenue for not admitting a feasible user. A new user is then admitted to the network only if the opportunity cost of not admitting the user is larger than the potential revenue gains of future call arrivals. Such a decision criterion is appropriate, for example, in situations involving multiple service or user classes with different performance requirements and different price targets. In such situations, the network may decide not to admit a lower-priority user, e.g., a "bronze" user, since it is expected that a higher-priority user, e.g., a "gold" user (paying a larger premium for the network services) would request access to the network shortly after the "bronze" user. The implicit assumption of course is that the bronze and the gold users cannot be supported simultaneously at the time of the request of the gold user (after possibly predicting the departure of some of the existing users and applications).

As another possible extension, if the decision module decides that the new user cannot be admitted to the network, the QoS requirements of the new user can be renegotiated. In such a case, the AC module 200 may propose the best QoS at which the new user could be accepted to the network without significantly impacting the performance of the existing users. Alternatively, the QoS requirements of some or all of the existing users can be renegotiated. The latter scenario may be appropriate, for example, if user applications can tolerate variable requirements, such as web browsing, file transfer or email. These requirements may be referred to as soft QoS constraints, as opposed to the stringent QoS requirements imposed by voice traffic or streaming video applications.

A further possible extension of the basic admission control approach is to allow for multiple new user arrivals. This scenario may arise, for example, if the AC decisions are only made very infrequently so that the time between successive decision instances spans across several user inter-arrival times. The AC module is then faced with the additional question of which new user should be admitted to the system. In general, it is possible that a later-arriving user may be admitted to the network rather than the first arriving user, if this were deemed more beneficial for the network-wide performance.

In the remaining portion of the description, two specific examples of admission control that may be implemented in the AC module 200 will be described in greater detail. The first involves admission control for best effort data applications with minimum throughput requirements, and the second involves admission control for VoIP applications with maximum frame error rates. It is to be appreciated that these examples are intended merely to illustrate the operation of particular implementations of the admission control techniques that were generally described above. The various processing details associated with these examples should not be construed as limitations of the invention, and numerous alternative arrangements may be used in implementing the admission control techniques of the invention. Similarly, the assumptions made in conjunction with these examples, like other assumptions herein, are not to be viewed as limitations of the invention, and need not be present in alternative embodiments.

EXAMPLE 1

AC for Best Effort Data Applications with Minimum Throughput Requirements

It is assumed that all the users have a best effort data application with minimum throughput requirements $R_{min}$. In other words, the QoS requirements are only specified in terms of a minimum average achieved throughput per user.

It is also assumed that the scheduler in this example employs a basic C-RMAX algorithm to allocate time slots and power resources to the competing users. The C-RMAX algorithm is described in U.S. Patent Application Publication No. 2003/0214951, which is incorporated by reference herein. It should be noted that the C-RMAX algorithm is only used for illustration purposes and that all the concepts immediately transpose to other scheduling algorithms, such as, for example, the Proportional Fair, the Round Robin, the RMAX or the Largest Queue First scheduling algorithms. It is one particular advantage of the admission control techniques of the illustrative embodiments that such techniques are independent of the underlying scheduling algorithms. Accordingly, the invention does not require the use of any particular scheduling algorithm.

It is further assumed that K users are already admitted to the system and that their minimum throughput requirements are satisfactorily met. An additional user, indexed K+1, arrives to the system at time t, when the AC decision has to be made. The AC module is called upon whenever a new user requests access to the system, and makes the decision sequentially for each newly arriving user.

Yet another assumption is that the call inter-arrival times are large compared to the time required to make the AC decision and for the new system to settle down in the new steady-state.

Figure 3:
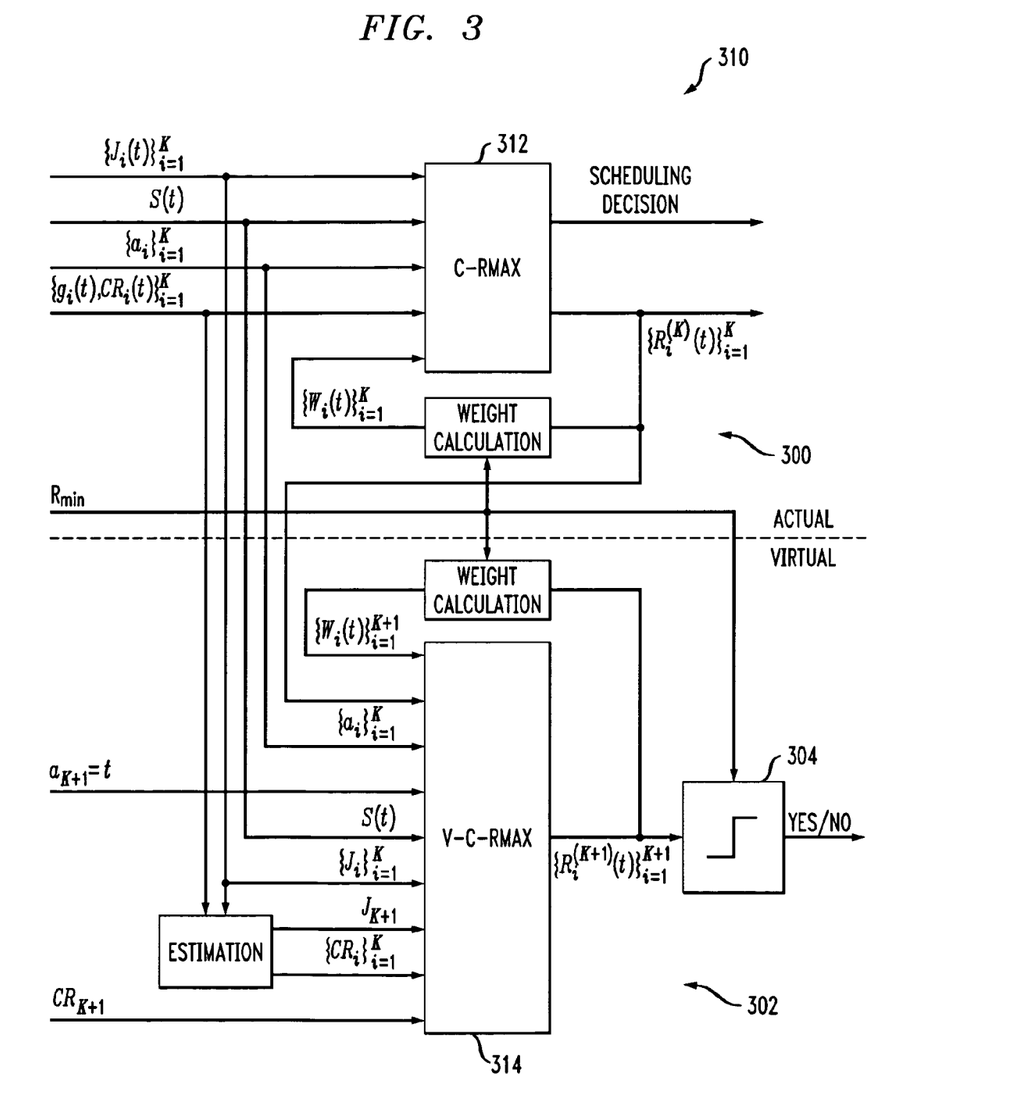
FIG. 3 is a more detailed block diagram showing one possible implementation of the illustrative admission control module and scheduler of FIG. 2B.

FIG. 3 shows an AC module 300 configured in accordance with the present example. The AC module 300 comprises an evaluation module 302 and a decision module 304. The evaluation module 302 comprises a virtual scheduler 314, also noted herein as a V-C-RMAX scheduler. The AC module 300 is part of a processing element 310 which further comprises a scheduler 312. The scheduler 312 implements the above-noted C-RMAX scheduling algorithm in order to make a scheduling decision. In the figure, the scheduler 312 is shown on an "actual" side of the processing element, because it performs actual scheduling operations, while the virtual scheduler 314 is shown on a "virtual" side of the processing element, since it performs virtual scheduling operations for purposes of generating a performance metric which is used to make an AC decision. Both the actual and virtual sides of the processing element may be implemented at least in part in software using processor and memory components of the processing element.

The inputs to the AC module 300 include $R_i^{(K)}(t)$, for i= 1, . . . , K, that is, the average received throughput of all K admitted users before the new user K+1 is admitted to the system. Since the system of K users is deemed to be feasible, we must have that, $\forall i=1, \ldots, K, R_i^{(K)}(t) \geq R_{min}$.

Let $g_i(t)$ be the average channel condition of user i as estimated at time t, and let $CR_i(t)$ be the average channel rate of user i at time t. These average values for the already admitted users are calculated over appropriate time windows of length W. The geometry of the new user is measured during an initial power-up and registration phase and is subsequently assumed to be known. If users move substantially, the geometry should be monitored periodically and the corresponding values updated.

The instantaneous channel conditions are estimated based on one of several possibilities. The channel conditions and the corresponding transmission rates of the existing users can be taken to be equal to the values measured in the past. If the past values are stored in a buffer, they could be re-used by assuming that the future channel conditions are statistically equal to the past measurements. Another method would be to use the past measurements to determine a model, or the parameters in a class of models for the channel behavior. The future channel conditions can then be obtained by sampling the presumed model. As another example, a very simple method would be to approximate the instantaneous channel conditions by their average values. However, this latter method may perform poorly under certain conditions as it tends to underestimate the potential impact of multi-user diversity gains in opportunistic scheduling algorithms.

The following parameters of the C-RMAX scheduler are assumed to be passed from the scheduler module 312 to the evaluation module 302: the system stretch S(t), the individual job sizes $J_i(t)$, the scheduler weights $W_i(t)$, and the arrival times of the jobs $a_i$. The values of the above quantities can be obtained from the scheduler for the existing users, i.e., for the users that have already been admitted to the network. Regarding the new user, it is possible that certain of the above quantities may be a priori known (such as the job size, if application-layer information is available). However, in most scenarios, these quantities have to be predicted or otherwise estimated, based on available statistical information regarding the user behavior. If such statistical information is not available, as may be the case in the most basic version of the AC module, the quantities may be approximated based on available information regarding the existing users.

As noted above, the evaluation module 302 in this example comprises a virtual scheduler 314. The virtual scheduler, denoted V-C-RMAX, emulates the operations of the actual scheduler 312 by performing very similar operations as the C-RMAX scheduler, albeit on the augmented system of K+1 users. However, V-C-RMAX is slightly simpler than C-RMAX, in the following ways:

1. The virtual scheduler 314 operates on the predicted values of the instantaneous channel conditions and their corresponding transmission rates. The prediction of these channel conditions was discussed above in the context of the inputs required for the evaluation module.

2. The job sizes $J_i$ of the existing users are set equal to their current job sizes, as provided by the actual scheduler 312. The initial job size of user K+1 is set to the average value of the job sizes of all existing users. Again, since we do not model the effect of flow control, the job sizes are assumed constant and fixed at their initial values throughout the operation of the virtual scheduler 314. In a first approximation, we assume that the traffic model of the data applications may be ignored and that the users' queues are infinitely backlogged. This would lead to an underestimation of the number of admissible users as it tends to ignore the statistical multiplexing gains that can be obtained from the stochastic and bursty nature of the data traffic. Of course, this is simply one example of setting job sizes, and numerous alternative techniques may be used.

3. The system stretch S used in the virtual scheduler 314 is equal to the value of the system stretch in the actual scheduler 312 at time t, but then remains fixed at this value. The value of the stretch is assumed to be the same for all the users in the network (i.e., existing and new users). Note that if user-specific stretch values are available and used in the actual scheduling algorithm, the corresponding values and their updates should also be used in the virtual scheduling algorithm.

4. The achieved throughputs $R_i^{(K)}(t)$ of the existing users are initially set to their current values as transmitted by the actual scheduler 312. The initial throughput of the new user is set to 0. This initial value can be changed and should in fact be set to the initial throughput value considered in the C-RMAX implementation. During the operation of the virtual scheduler 314, the achieved throughputs are adjusted according to the transmission rates of the different users and the time slots in which the users are scheduled.

5. The scheduling weights $W_i(t)$ may be calculated as a function of the average achieved throughput, the minimum required throughput and one or more dimensionless control parameters. The initial values of the weights for the existing K users are those calculated by the actual scheduler 312. The initial weight of user K+1 can similarly be set based on an expected initial value of the throughput of user K+1, or alternatively based on an initial throughput of zero or other assumed initial value. The scheduling weights are recalculated after every scheduling decision of the C-RMAX algorithm and, along with the average achieved throughputs, are the only time-varying parameters in the operation of the virtual scheduler 314.

6. The arrival times $a_i$ of the existing users are those used by the actual scheduler 312, whereas the arrival time of the new user is set to t, the current time index when the AC module 300 is evoked. Subsequently the arrival times remain fixed for all users.

Note that, since we assume that the arrival times and the job sizes are constant throughout the operation of the virtual scheduler, the average achieved throughput, as given by the virtual scheduler, is essentially the long-term average throughput, assuming that all the users' queues are infinitely backlogged.

The virtual scheduler 314 performs substantially the same operations that would be performed by the actual scheduler 312, albeit on the set of K+1 users with the additional simplifications and approximations described above. The virtual scheduler runs its operations until the average throughput values have essentially converged and the new (virtual) system of K+1 users has reached its steady state. Denote by $R_i^{(K+1)}(t+\Delta)$, for i=1, ..., K+1, the average achieved throughputs by the new system of K+1 users at time t+Δ, where Δ denotes the number of time slots simulated by the virtual scheduler until convergence of the new system. These quantities represent the performance metric as an estimate of the QoS that may be achieved in the new system, assuming that the new user was in fact admitted.

The decision module 304 compares the new average achieved throughputs to the minimum required throughput $R_{min}$. In order to include some margin for channel uncertainties and modeling errors, a QoS margin δ is defined. In general, δ is taken to be a non-negative, fixed parameter. The new system is then deemed feasible, and the new user is in fact admitted to the network, if the following condition is satisfied for all users i=1, ..., K+1:

$$R_i^{(K+1)}(t+\Delta) \geq (1+\delta)R_{min}.$$

The default value of δ is 0, meaning that the new user is admitted to the network as long as the average achieved throughputs, as calculated by the virtual scheduler, exceed the minimum throughput requirement.

If the AC module as described here is deemed too conservative, negative values of δ can also be considered. Note that setting the value of δ to δ=−1 effectively disables the AC module. All the above calculations are in fact still performed, but, since the achieved throughput is always positive, the feasibility condition is always satisfied for all the users. Hence, with δ=−1, the new user is always admitted to the system. In general, δ is a tunable parameter that defines the aggressiveness of the AC module and provides a tradeoff between blocking users and satisfying the QoS requirements with greater reliability. An additional generalization would adjust the value of the parameter δ to the number of users in the system. In other words, δ may be a function of K and may, for example, allow the network operator to reduce the aggressiveness of the AC module as the number of users in the system increases.

The AC module should be configured with sufficient processing capabilities to perform these operations in a relatively short time to avoid an excessive delay in the eventual call admission decision.

EXAMPLE 2

AC for VoIP Applications with Maximum Frame Error Rates

In the present example, we illustrate how the previous example relating to best effort data applications can be modified for VoIP applications. In order to avoid too much duplication, we only concentrate on those aspects that are changed and summarize those aspects that are the same for both applications. The described techniques can be extended in a straightforward manner to combinations of best effort data applications and VoIP applications, and to a wide variety of other types of other applications, alone or in combination.

It is assumed that all the users have a VoIP application, for which the QoS requirement is specified in terms of the maximum allowed frame error rate $F_{max}$. The frame error rate includes all the packets that have not been received correctly and those that have been correctly received but with an unacceptably large delay.

For simplicity and to show that our framework is applicable for different scheduling algorithms, we assume here that the scheduler employs a very simple Proportional Fair (PF) scheduling algorithm. The basic PF algorithm may be augmented with a delay-sensitive priority calculation to give higher priority to those users that are close to exceeding a pre-specified delay budget. We implicitly assume that the scheduling algorithm is not otherwise modified from the basic version of PF and in particular does not take into account the fact that the underlying application is VoIP.

We assume that K users are already admitted to the system and that their frame error rates do not exceed the maximum allowed frame error rates. An additional user, indexed K+1, arrives to the system at time t, when the AC decision has to be made. The AC module is called upon whenever a new user requests access to the system and makes the decision sequentially for each newly arriving user. It is also assumed that the call inter-arrival times are large compared to the time required to make the AC decision and for the new system to settle down in the new steady-state.

The inputs to the AC module in this example include $F_i^{(K)}(t)$, for i=1, ..., K, that is, the average frame error rate achieved by each of the K admitted users before the new user K+1 is admitted to the system. Since the system of K users is deemed to be feasible, we must have that, $\forall i=1, \ldots, K$, $F_i^{(K)}(t) \leq F_{max}$.

Let $g_i(t)$ be the average channel condition of user i as estimated at time t, and let $CR_i(t)$ be the average channel rate of user i at time t. These average values for the already admitted users are calculated over appropriate time windows of length W. The geometry of the new user is assumed to be measured during the initial power-up and registration phase.

The following parameters of the PF scheduler are assumed to be passed from the scheduler module to the AC evaluation module: the average achieved user throughput $R_i^{(K)}(t)$, the time constant $t_c$, used in the exponential smoothing calculation of the average achieved throughput, the scheduler weights $W_i(t)$, and the deadlines $D_{i-max}$, if the scheduler takes into account the delay-sensitive nature of the application and attempts to give higher priority to users whose deadlines are approaching. We note that this represents a deviation from the original and the most basic version of the PF scheduler.

The values of the above quantities can be obtained from the scheduler for the existing users. Regarding the new user, the above quantities may be a priori known. However, in most scenarios, these quantities have to be predicted or otherwise estimated, based on available statistical information regarding the user behavior. If such statistical information is not available, as may be the case in the most basic version of the AC module, the quantities are approximated based on available information regarding the existing users.

In addition, for VoIP applications, the virtual scheduler has to be aware of any enhancements on the transmission format, such as frame aggregation, adaptive aggregation and multi-user aggregation. If such enhancements are implemented in the system, they have to be replicated in the virtual scheduler as well to properly take into account their impact on performance and capacity.

The evaluation module in this example comprises a virtual scheduler, referred to herein as V-PF, which emulates the operations of the actual PF scheduler by performing very similar operations as the actual PF scheduler, albeit on the augmented system of K+1 users. However, V-PF is slightly simpler than PF and the comments similar to those applicable in the case of the best effort data application still apply here.

The virtual scheduler runs its operations until the average frame error rates have essentially settled to their steady state values. Denote by $F_i^{(K+1)}(t+\Delta)$, for $i=1, \ldots, K+1$, the frame error rates as measured by the evaluation module for the new system of K+1 users at time $t+\Delta$, where $\Delta$ denotes the number of time slots simulated by the virtual scheduler until convergence of the new system. These quantities represent the performance metric as an estimate of the QoS that may be achieved in the new system, assuming that new user was in fact admitted. The evaluation module in this case calculates the delay experienced by each voice frame and compares it to the delay budget that can be tolerated over the air interface. This is the maximum delay that can be tolerated by the queuing, scheduling, aggregation and transmission between the base station and the user terminal. If the calculated delay exceeds the maximum delay budget, the frame is considered to be lost. The frame error rate is then simply calculated as the percentage of lost frames over the time interval $\Delta$ over which the impact of the new user on the network is assessed.

The decision module compares the new average frame error rates to the maximum allowed frame error rates $F_{max}$. As in the previous example, a QoS margin $\delta$ may be defined in order to include some margin for channel uncertainties and modeling errors. The new system is then deemed feasible, and the new user is in fact admitted to the network, if the following condition is satisfied for all users $i=1, \ldots, K+1$:

$$F_i^{(K+1)}(t+\Delta) \leq (1-\delta)F_{max}.$$

The QoS margin $\delta$ defines the aggressiveness of the AC module and provides a tradeoff between blocking users and satisfying the QoS requirements. The default value of $\delta$ in this example is 0 and in general $\delta$ takes on values smaller than 1. In particular, $\delta>0$ is a conservative setting, $\delta=0$ is an exact setting, and $\delta<0$ is an aggressive setting. Further, setting $\delta$ to a large negative number effectively disables the AC module. We emphasize again that $\delta$ could be adjusted as a function of the number of users in the system.

The illustrative embodiments of the invention as described above provide a number of significant advantages over conventional practice. For example, the admission control techniques of these embodiments incorporate the QoS requirements of the different users into the admission control decision. Also, the admission control decision is tailored towards wireless packet data networks and the use of opportunistic scheduling algorithms.

Another advantage is that the admission control decision is based on the current system state, as well as the predicted or otherwise estimated performance if the new user were to be added. The use of the virtual scheduler allows for reliable prediction of the performance as it operates in substantially the same manner as the corresponding actual scheduler would. In addition, the virtual scheduler allows the admission control to incorporate the details of the actual scheduler, the instantaneous channel conditions and the traffic dynamics.

A further advantage is that the admission control decision is based on the status of the network at the time of the request for admission of the new user and the prediction of the evolution of the status of the network if the new user is admitted to the network. The admission control decision does not rely on historical data and network behavior but operates in real-time based on the actual state of the network.

As mentioned elsewhere herein, yet another advantage is that the admission control techniques of the illustrative embodiments are independent of the underlying scheduling algorithms.

Again, it should be emphasized that the embodiments of the invention as described herein are intended to be illustrative only.

For example, the techniques described above are applicable to a wide variety of different types of wireless networks or other systems. The techniques can be used in networks having a very diverse population of users, with different applications, services and QoS requirements. Current and next-generation wireless networks can benefit from these techniques, including, without limitation, CDMA 2000 and UMTS networks.

As indicated previously, the admission control techniques of the illustrative embodiments are applicable to the forward and the reverse links in wireless networks and are not limited to any particular system type. Accordingly, these techniques are applicable to a wide variety of systems. The implementation can be adapted in a straightforward manner to accommodate the particular details of a given wireless network or other system.

Furthermore, the techniques of the illustrative embodiments can be adapted in a straightforward manner for use with any type of scheduling algorithm. The use of a virtual scheduler that emulates the actual scheduling operations provides a reliable prediction of the expected network-wide performance of the augmented system and therefore leads to reliable admission control decisions. The techniques do not require mathematical descriptions of the achievable performance under the particular scheduling algorithm that is used. A variety of different types of virtual schedulers can be used, providing different types of emulation of actual scheduler operation. A virtual scheduler can be incorporated at least in part into an actual scheduler, such that the two schedulers share certain common elements.

It is to be appreciated that the techniques described herein can be adapted in a straightforward manner to systems in which different users have different types of QoS requirements, with a given user having one or more requirements based on, for example, throughput, frame error rate, delay bounds, delay jitter, or other type of requirement, in any combination.

As noted above, the present invention may be implemented at least in part in the form of one or more software programs that, within a given processing element, are stored in a memory and run on a processor. Such processor and memory elements may comprise one or more integrated circuits.

Numerous other alternative embodiments within the scope of the following claims will be readily apparent to those skilled in the art.

We claim:

1. An apparatus for controlling admission of users to a communication system, the apparatus comprising:
    a first scheduler configured to manage access to network resources for users already admitted to the system; and
    an admission control module coupled to the first scheduler, the admission control module comprising a second scheduler which emulates operation of the first scheduler, under an operating scenario involving admission of at least one additional user to the system, in order to generate at least one performance metric which is used to make an admission control decision regarding admission of the at least one additional user to the system;

wherein the admission control decision is based on whether the system can support quality-of-service requirements of the at least one additional user without violating any quality-of-service requirements of the users already admitted to the system;

wherein the quality-of-service requirements for one or more of K admitted users are specified in terms of at least one of a minimum average throughput $R_{min}$ per user and a maximum allowed frame error rate $F_{max}$ per user, where K is a positive integer;

wherein the admission control module receives as inputs $R_i^{(K)}(t)$, for i=1, ..., K, where $R_i^{(K)}(t)$ denotes the average throughput of admitted user i before a new user K+1 is admitted to the system, and where for all i= 1, ..., K, $R_i^{(K)}(t) \geq R_{min}$;

wherein the second scheduler emulates the operation of the first scheduler as applied to a system with K+1 users, and the performance metric is generated as $R_i^{(K+1)}(t+\Delta)$, for i+1, ..., K+1, where $R_i^{(K+1)}(t+\Delta)$ denotes the average throughput of user i in the system with K+1 users at time $t+\Delta$, and where $\Delta$ denotes a convergence time of the system with K+1 users; and wherein the admission control decision comprises a decision to admit the new user K+1 to the system if the following condition is satisfied for all users i=1, ..., K+1:

$$R_i^{(K+1)}(t+\Delta) \geq (1+\delta)R_{min},$$

where $\delta$ is a variable margin parameter.

2. The apparatus of claim 1 wherein the second scheduler comprises a virtual scheduler that does not manage access to network resources.

3. The apparatus of claim 1 wherein at least a subset of the users are associated with respective communication devices.

4. The apparatus of claim 1 wherein at least two of the users comprise different applications associated with a single communication device.

5. The apparatus of claim 1 wherein the admission control module comprises an evaluation module which implements the second scheduler for generating the performance metric, and a decision module adapted to receive the performance metric from the evaluation module and to make the admission control decision based on the performance metric.

6. The apparatus of claim 5 wherein the evaluation module receives as inputs one or more QoS-related inputs, one or more RF-related inputs, and one or more scheduler-related inputs, and processes the inputs to generate the performance metric.

7. The apparatus of claim 1 wherein the first scheduler and the admission control module are implemented in a base station of the system.

8. The apparatus of claim 1 wherein the first scheduler is implemented in a base station of the system and the admission control module is implemented in a radio network controller of the system.

9. An apparatus for controlling admission of users to a communication system, the apparatus comprising:

a first scheduler configured to manage access to network resources for users already admitted to the system; and an admission control module coupled to the first scheduler, the admission control module comprising a second scheduler which emulates operation of the first scheduler, under an operating scenario involving admission of at least one additional user to the system, in order to generate at least one performance metric which is used to make an admission control decision regarding admission of the at least one additional user to the system;

wherein the admission control decision is based on whether the system can support quality-of-service requirements of the at least one additional user without violating any quality-of-service requirements of the users already admitted to the system;

wherein the quality-of-service requirements for one or more of K admitted users are specified in terms of at least one of a minimum average throughput $R_{min}$ per user and a maximum allowed frame error rate $F_{max}$ per user, where K is a positive integer;

wherein the admission control module receives as inputs $F_i^{(K)}(t)$, for i=1, ..., K, where $F_i^{(K)}(t)$ denotes average frame error rate achieved by admitted user i before a new user K+1 is admitted to the system, and where for all i= 1, ..., K, $F_i^{(K)}(t) \leq F_{max}$;

wherein the second scheduler emulates the operation of the first scheduler as applied to a system with K+1 users, and the performance metric is generated as $F_i^{(K+1)}(t+\Delta)$, for i +1, ..., K+1, where $F_{i(K+1)}(t+\Delta)$ denotes the frame error rate of user i in the system with K+1 users at time $t+\Delta$, and where $\Delta$ denotes a convergence time of the system with K+1 users; and wherein the admission control decision comprises a decision to admit the new user K+1 to the system if the following condition is satisfied for all users i=1, ..., K+1:

$$F_i^{(K+1)}(t+\Delta) \leq (1-\delta)F_{max},$$

where $\delta$ is a variable margin parameter.

10. The apparatus of claim 9 wherein the second scheduler comprises a virtual scheduler that does not manage access to network resources.

11. The apparatus of claim 9 wherein at least a subset of the users are associated with respective communication devices.

12. The apparatus of claim 9 wherein at least two of the users comprise different applications associated with a single communication device.

13. The apparatus of claim 9 wherein the admission control module comprises an evaluation module which implements the second scheduler for generating the performance metric, and a decision module adapted to receive the performance metric from the evaluation module and to make the admission control decision based on the performance metric.

14. The apparatus of claim 13 wherein the evaluation module receives as inputs one or more QoS-related inputs, one or more RF-related inputs, and one or more scheduler-related inputs, and processes the inputs to generate the performance metric.

15. The apparatus of claim 9 wherein the first scheduler and the admission control module are implemented in a base station of the system.

16. The apparatus of claim 9 wherein the first scheduler is implemented in a base station of the system and the admission control module is implemented in a radio network controller of the system.

* * * * *

UNITED STATES PATENT AND TRADEMARK OFFICE
CERTIFICATE OF CORRECTION

PATENT NO. : 7,660,244 B2  Page 1 of 1
APPLICATION NO. : 11/156752
DATED : February 9, 2010
INVENTOR(S) : Srinivas R. Kadaba et al.

It is certified that error appears in the above-identified patent and that said Letters Patent is hereby corrected as shown below:

Claim 1, col. 17, line 24, please delete "i+1" and insert therefor --i=1--.

Claim 9, col. 18, line 27, please delete "i+1" and insert therefor --"i=1"--.

Claim 9, col. 18, line 27, please change "(K+1)" from subscript to superscript.

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,660,244 B2 Page 1 of 1
APPLICATION NO. : 11/156752
DATED : February 9, 2010
INVENTOR(S) : Kadaba et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1215 days.

Signed and Sealed this

Twenty-eighth Day of December, 2010

David J. Kappos
*Director of the United States Patent and Trademark Office*